US012699923B2

(12) United States Patent
Dogra et al.

(10) Patent No.: US 12,699,923 B2
(45) Date of Patent: Aug. 4, 2026

(54) SYSTEM AND METHOD FOR DISTRIBUTED LEARNING OF UNIVERSAL VECTOR REPRESENTATIONS ON EDGE DEVICES

(71) Applicant: Samsung Electronics Co., Ltd., Suwon-si (KR)

(72) Inventors: Mrinaal Dogra, Jammu (IN); Parameswaranath Vadackupurath Mani, Thuravoor (IN); Beda Prakash Meher, Sundargarh (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 847 days.

(21) Appl. No.: 17/946,349

(22) Filed: Sep. 16, 2022

(65) Prior Publication Data

US 2023/0088381 A1    Mar. 23, 2023

(30) Foreign Application Priority Data

Sep. 17, 2021    (IN) .............................. 202141042283
Sep. 6, 2022    (IN) .............................. 2021 41042283

(51) Int. Cl.
*G06N 20/00* (2019.01)

(52) U.S. Cl.
CPC .................................... *G06N 20/00* (2019.01)

(58) Field of Classification Search
CPC .............................. G06N 20/00; G06N 3/098
See application file for complete search history.

(56) References Cited

U.S. PATENT DOCUMENTS

| | | | |
|---|---|---|---|
| 5,586,186 | A | 12/1996 | Yuval et al. |
| 8,463,756 | B2 | 6/2013 | Sarshar et al. |
| 9,740,680 | B1 | 8/2017 | Mikolov et al. |
| 10,860,936 | B2 | 12/2020 | Lindsley |
| 2013/0144884 | A1 | 6/2013 | Raichelgauz et al. |
| 2019/0164060 | A1 | 5/2019 | Gulin |
| 2019/0318268 | A1* | 10/2019 | Wang .................. H04L 67/1095 |
| 2019/0354878 | A1* | 11/2019 | Acar ...................... G06F 16/36 |

OTHER PUBLICATIONS

"UVeQFed: Universal Vector Quantization for Federated Learning" (hereinafter Nir) Published Dec. 23, 2020 (Year: 2020).*
Wang et al., "KG2Vec: A node2vec-based vectorization model for knowledge graph", PLOS One, https://www.ncbi.nlm.nih.gov/pmc/articles/PMC8009404/.
Ni et al., "Perceive Your Users in Depth: Learning Universal User Representations from Multiple E-commerce Tasks", arXiv:1805.10727v1 [stat.ML] May 28, 2018.

* cited by examiner

*Primary Examiner* — Pei Yong Weng
(74) *Attorney, Agent, or Firm* — Jefferson IP Law, LLP

(57) ABSTRACT

A method and system for learning universal vector representation of concepts in a distributed environment comprising a plurality of edge devices are provided. The method includes obtaining data from one or more sources available at the candidate edge device, determining a plurality of concepts from the obtained data, training on-device artificial intelligence (AI) model locally available at the candidate edge device using the plurality of concepts. The method also includes transmitting the at least one trained on-device AI model to a server and receiving a global AI model for deployment from the server. The method further includes deploying the global AI model for universal vector representation of concepts in the candidate edge device.

16 Claims, 20 Drawing Sheets

Indicating that $C_1$ and $C_2$ are related to each other w.r.t defined relation Indicating that $C_1$ and $C_2$ are not related to each other w.r.t defined relation ① User shopping online ② App Recommendation Solution queries UCR Engine for representations of all user apps and context ③ App Recommendation Solution updates the app recommendation widget with apps relevant to current user context User puts on
earbuds User starts
music app User puts on
shoes User
Jogging/Running

SYSTEM AND METHOD FOR DISTRIBUTED LEARNING OF UNIVERSAL VECTOR REPRESENTATIONS ON EDGE DEVICES

CROSS-REFERENCE TO RELATED APPLICATION(S)

This application is based on and claims priority under 35 U.S.C. § 119(a) of an Indian Provisional patent application number 202141042283, filed on Sep. 17, 2021, in the Indian Intellectual Property Office, and of an Indian Complete patent application number 202141042283, filed on Sep. 6, 2022, in the Indian Intellectual Property Office, the disclosure of each of which is incorporated by reference herein in its entirety.

BACKGROUND

1. Field

The disclosure relates to a machine learning. More particularly, the disclosure relates to a system and method for distributed learning of universal vector representations on edge devices.

2. Description of Related Art

Recommendations of products or services are used by the edge devices to expose users to items with which the users may not be aware but may have a potential interest. For example, recommendations involving the products may be provided by the edge devices to a user of a shopping service system or recommendations of movies may be provided to a user of an online streaming service system, and so on. Recommendations have become one of the major drivers as part of a decision making process by the users to interact with digital content and even in some places has supplanted search in locating products or services of interest.

A method and system of the related art for recommending the products or services uses centralized machine learning (ML) models. The centralized ML models are trained on a server by collecting data from the edge devices. It involves data leaving the edge devices, and is prone to challenges like data privacy breach/attacks, and user's unwillingness to share the private data.

A method and system of the related art for recommending the products or services uses on-device ML models. The on-device ML models are trained on the edge devices, limited to problem statements which can be learned with individual data. Limited data allows only simple models, inefficient in learning new knowledge, and no knowledge sharing across users/apps.

A method and system of the related art for recommending the products or services uses distributed ML models. The distributed ML models are trained on the edge devices without taking the data out, and the trained ML models are aggregated for generalization. However, identifying concepts/entities universally without sharing the user data, non-uniformity of the user data across the edge devices, and difficulty in learning from cross-domain data are the challenges in the distributed ML models. The above limitations highlight a need for a reliable distributed learning system which supports generic cross-domain data available across users, and apps on the edge devices, without taking the data out of the edge devices.

Thus, it is desired to address the above mentioned disadvantages or other shortcomings or at least provide a useful alternative.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a system and method for distributed learning of universal vector representations on the edge devices. The proposed system and method supports generic cross-domain data available across users, and apps on the edge devices, without taking the data out of the edge devices.

Additional aspects will be set forth in part in the description which follows and, in part, will be apparent from the description, or may be learned by practice of the presented embodiments.

According to an embodiment, a method for learning universal vector representation of concepts in a distributed environment comprising a plurality of edge devices is provided. The method may include obtaining, by a candidate edge device from the plurality of edge devices, data from one or more sources available at the candidate edge device. The method may include determining, by the candidate edge device, a plurality of concepts from the obtained data. The method may include training, by the candidate edge device, at least one on-device artificial intelligence (AI) model locally available at the candidate edge device using the plurality of concepts, wherein the at least one trained on-device AI model is specific to learning of universal vector representation of concepts available at the candidate edge device. The method may include transmitting, by the candidate edge device, the at least one trained on-device AI model to a server. The method may include receiving, by the candidate edge device, a global AI model for deployment from the server, wherein the global AI model is specific to learning of universal vector representation of the concepts available at the candidate edge device and learning of the universal vector representation of concepts available across remaining edge devices of the plurality of edge devices in the distributed environment. The method may include deploying, by the candidate edge device, the global AI model for universal vector representation of concepts in the candidate edge device.

According to an embodiment, a method for learning universal vector representation of concepts in a distributed environment comprising a plurality of edge devices is provided. The method may include transmitting, by a server, at least one on-device artificial intelligence (AI) model to perform training of the at least one on-device AI model in each edge device of the plurality of edge devices. The method may include transmitting, by a server, at least one on-device artificial intelligence (AI) model to perform training of the at least one on-device AI model in each edge device of the plurality of edge devices. The method may include receiving, by the server, at least one trained on-device AI model from each edge device of the plurality of edge devices, wherein the at least one trained on-device AI model received from each edge device of the plurality of edge devices is specific to learning of universal representation of concepts available at the edge device of the plurality of edge devices. The method may include generating, by the server, a global AI model by aggregating the at least one trained on-device AI model received from each edge device of the plurality of edge devices. The method may include transmitting, by the server, the global AI model to each edge device of the plurality of edge devices for deployment at each edge device of the plurality of edge devices, wherein the global AI model is specific to learning of the universal vector representation of concepts across the plurality of edge devices in the distributed environment.

According to an embodiment, an edge device for learning universal vector representation of concepts in a distributed environment comprising a plurality of edge devices is provided. The edge device may include a memory and at least one processor coupled to the memory. The at least one processor may configure to obtain data from one or more sources available at the edge device. The at least one processor may be configured to determine a plurality of concepts from the obtained data. The at least one processor may be configured to train on-device artificial intelligence (AI) model locally available at the edge device using the plurality of concepts, wherein the at least one trained on-device AI model is specific to learning of universal vector representation of concepts available at the edge device. The at least one processor is also configured to transmit the trained on-device AI model to a server. The at least one processor may be configured to receive a global AI model for deployment from the server, wherein the global AI model is specific to learning of universal vector representation of the concepts available at the edge device and learning of the universal vector representation of concepts available across remaining edge devices of the plurality of edge devices in the distributed environment. The at least one processor may be configured to deploy the global AI model for universal vector representation of concepts in the edge device.

According to an embodiment, a non-transitory computer-readable storage medium, having a computer program for learning universal vector representation of concepts in a distributed environment, which implemented on at least one processor, is provided. The at least one processor may be configured to determine a plurality of concepts from the obtained data. The at least one processor may be configured to train on-device artificial intelligence (AI) model locally available at the edge device using the plurality of concepts, wherein the at least one trained on-device AI model is specific to learning of universal vector representation of concepts available at the edge device. The at least one processor is also configured to transmit the trained on-device AI model to a server. The at least one processor may be configured to receive a global AI model for deployment from the server, wherein the global AI model is specific to learning of universal vector representation of the concepts available at the edge device and learning of the universal vector representation of concepts available across remaining edge devices of the plurality of edge devices in the distributed environment. The at least one processor may be configured to deploy the global AI model for universal vector representation of concepts in the edge device. According to an embodiment, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 6 illustrates an artificial intelligence (AI) engine in an edge device for learning universal vector representation of concepts in a distributed environment according to an embodiment of the disclosure;

FIG. 7 illustrates a concept representation builder (CRB) in an edge device for learning universal vector representation of concepts according to an embodiment of the disclosure;

The same reference numerals are used to represent the same elements throughout the drawings.

DETAILED DESCRIPTION

Figure 1:
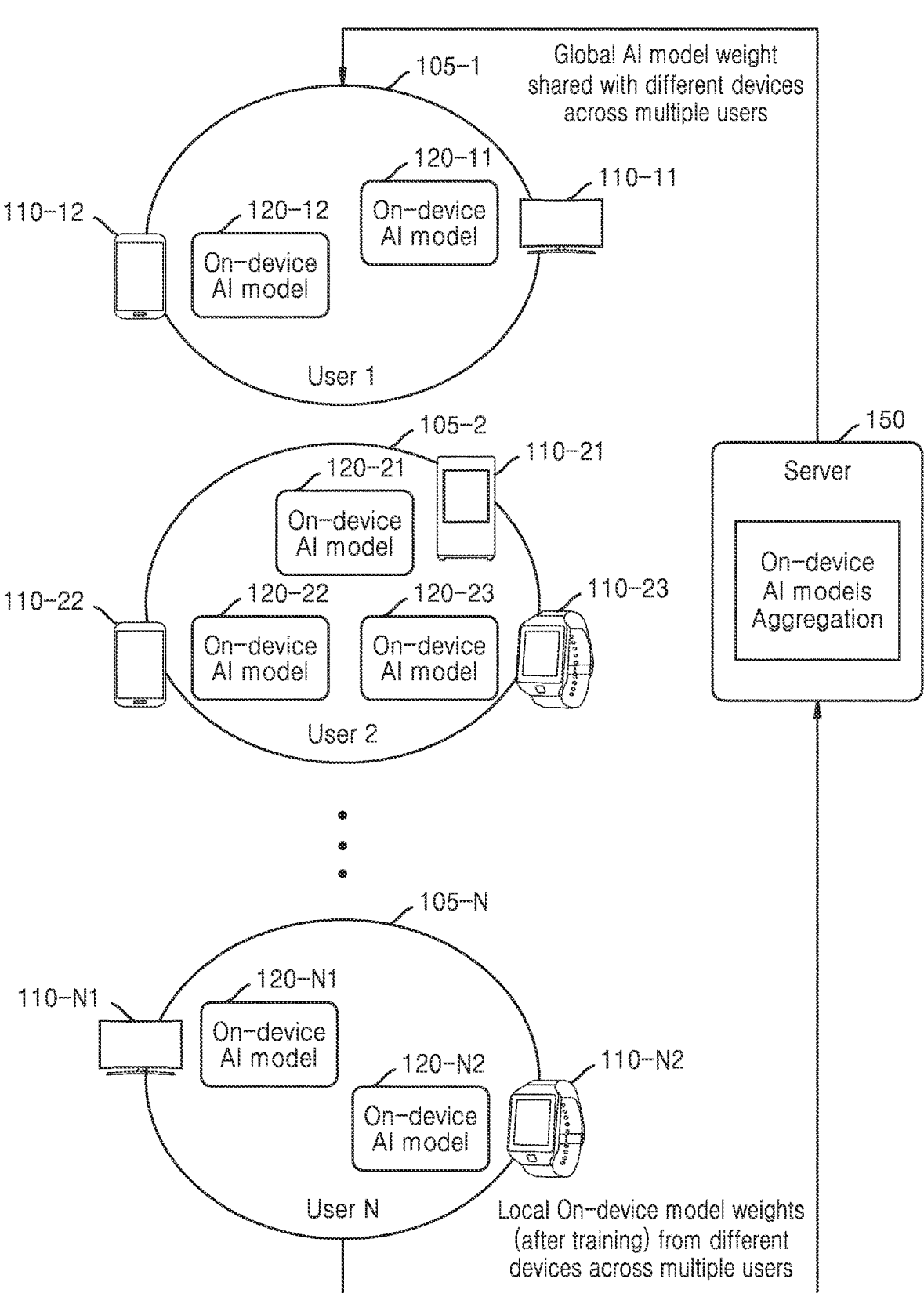
FIG. 1 illustrates a system for distributed learning of universal vector representations of concepts according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In addition, the various embodiments of the disclosure described herein are not necessarily mutually exclusive, as some embodiments can be combined with one or more other embodiments to form new embodiments. The term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

As is traditional in the field, embodiments of the disclosure may be described and illustrated in terms of blocks which carry out a described function or functions. These blocks, which may be referred to herein as managers, units, modules, hardware components or the like, are physically implemented by analog and/or digital circuits, such as logic gates, integrated circuits, microprocessors, microcontrollers, memory circuits, passive electronic components, active electronic components, optical components, hardwired circuits and the like, and may optionally be driven by firmware and software. The circuits may, for example, be embodied in one or more semiconductor chips, or on substrate supports, such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

Accordingly the embodiment herein is to provide a method for learning universal vector representation of concepts in a distributed environment comprising a plurality of edge devices. The method includes obtaining data from one or more sources available at the candidate edge device, determining a plurality of concepts from the obtained data; training on-device artificial intelligence (AI) model locally available at the candidate edge device using the plurality of concepts, where the trained on-device AI model is specific to learning of universal vector representation of concepts available at the candidate edge device. The method also includes transmitting the at least one trained on-device AI model to a server and receiving a global AI model for deployment from the server, wherein the global AI model is specific to learning of universal vector representation of the concepts and the relationships among the concepts available at the candidate edge device and learning of the universal vector representation of concepts and the relationships among the concepts available across remaining edge devices of the plurality of edge devices in the distributed environment. The method further includes deploying the global AI model for universal vector representation of concepts in the candidate edge device.

In the methods and systems of the related art, in order for learning universal vector representation of concepts, there are few challenges, such as identifying concepts/entities universally without sharing the user data, non-uniformity of the user data across the edge devices, and difficulty in learning from cross-domain data are some of the challenges in the distributed ML models. Unlike the methods and systems of the related art, the disclosure enables the support of generic cross-domain data available across users, and apps on the edge devices, without taking the data out of the edge devices.

Referring now to the drawings and more particularly to FIGS. 1 through 20, where similar reference characters denote corresponding features consistently throughout the figures, there are shown preferred embodiments.

FIG. 1 illustrates a system for distributed learning of universal vector representations of concepts according to an embodiment of the disclosure.

Referring to FIG. 1, a system 100 comprises a plurality of edge devices and a server 150. The plurality of edge devices includes one or more candidate edge devices associated with each of one or more users.

A first candidate edge device (i.e., a smart tv) 110-11 and a second candidate edge device (i.e., a smart mobile) 110-12 are associated with a user 1 105-1. Similarly, a first candidate edge device (i.e., a smart refrigerator) 110-21, a second candidate edge device (i.e., a smart mobile) 110-22, and a third candidate edge device (i.e., a smart watch) 110-23 are associated with a user 2 105-2. Similarly, a first candidate edge device (i.e., a smart TV) 110-N1 and a second candidate edge device (i.e., a smart watch) 110-N2 are associated with a user N 105-N. Each of the plurality of candidate edge device includes an on-device AI model 120-11, 120-12, 120-21, 120-22, 120-23, 120-N1, 120-N2, the on-device AI model is trained locally using a plurality of concepts available at that particular candidate edge device. Upon completion of the training, on-device AI model 120-11, 120-12, 120-21, 120-22, 120-23, 120-N1, 120-N 2 weights associated with each candidate edge device is sent to the server 150. The server 150 is configured to aggregate the on-device AI model 120-11, 120-12, 120-21, 120-22, 120-23, 120-N1, 120-N2 weights received from the plurality of candidate edge devices. Upon aggregating the on-device AI model 120-11, 120-12, 120-21, 120-22, 120-23, 120-N1, 120-N2 weights, the server 150 transmits global AI model weights with the plurality of edge devices, for universal vector representations of concepts and relationships available across different edge devices.

Figure 2:
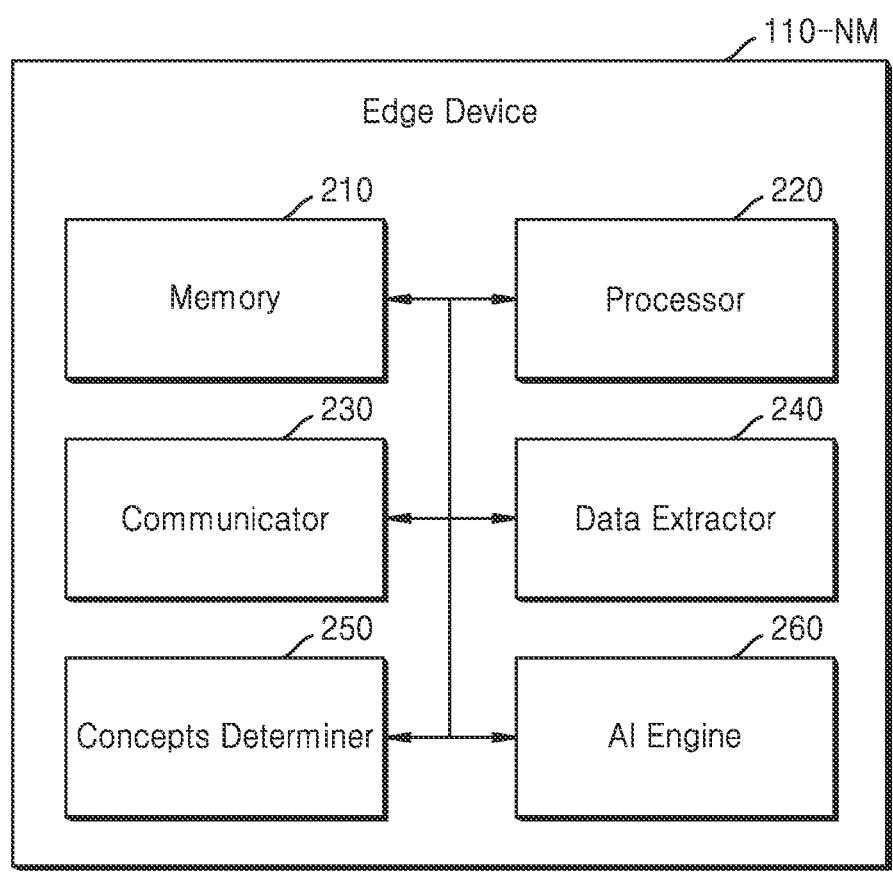
FIG. 2 illustrates a block diagram of an edge device for learning universal vector representation of concepts in an distributed environment according to an embodiment of the disclosure.

FIG. 2 illustrates a block diagram of an edge device 110-NM for learning universal vector representation of concepts in a distributed environment according to an embodiment of the disclosure.

Referring to FIG. 2, in an embodiment of the disclosure, the edge device 110-NM includes a memory 210, a processor 220, a communicator 230, data extractor 240, concepts determiner 250, and an AI engine 260.

The memory 210 also stores instructions to be executed by the processor 220. The memory 210 may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory 210 may, in some examples, be considered a non-transitory storage medium. The term "non-transitory" may indicate that the storage medium is not embodied in a carrier wave or a propagated signal. However, the term "non-transitory" should not be interpreted that the memory 210 is non-movable. In some examples, the memory 210 can be configured to store larger amounts of information than the memory. In certain examples, a non-transitory storage medium may store data that can, over time, change (e.g., in a random access memory (RAM) or cache). In an embodiment of the disclosure, the memory 210 can be an internal storage unit or it can be an external storage unit of the edge device 110-NM, a cloud storage, or any other type of external storage.

The processor 220 communicates with the memory 210, the communicator 230, the data extractor 240, the concepts determiner 250, and the AI engine 260. The processor 220 is configured to execute instructions stored in the memory 210 and to perform various processes.

The communicator 230 is configured for communicating internally between internal hardware components and with external devices via one or more networks. In an embodiment of the disclosure, the communicator 230 is configured to receive one or more on-device AI models from the server 150 for deployment at the AI engine 260 of the edge device 110-NM.

In one embodiment of the disclosure, the data extractor 240 is configured to obtain data from one or more sources available at the edge device 110-NM. In one embodiment of the disclosure, the one or more sources can be sensors located around the edge device 110-NM. According to an embodiment of the disclosure, the one or more sources can be App usage data, and work-out data.

In one embodiment of the disclosure, the concept determiner 250 is configured to determine a plurality of concepts from the obtained data. The plurality of concepts can be a plurality of device concepts, a plurality of profile concepts, and a plurality of content concepts. In one embodiment of the disclosure, the concept determiner 250 determines the plurality of device concepts based on sensor information received from the one or more sources available at the edge device 110-NM. The concept determiner 250 determines the plurality of profile concepts based on one or more user behaviour information received from the one or more sources available at the edge device 110-NM. The concept determiner 250 determines the plurality of content concepts determined based on other information received from the one or more sources available at the edge device 110-NM. The other information can be content or media information.

In one embodiment of the disclosure, the AI engine 260 includes on-device AI model that is trained using the plurality of concepts determined by the concept determiner 250. In one embodiment of the disclosure, the trained on-device AI model is specific to learning of universal vector representation of concepts available at that particular edge device 110-NM. In one embodiment of the disclosure, the on-device AI model comprises at least one concept representation generator model and at least one relationship model. The at least one concept representation generator model generates at least one concept representation for the plurality of concepts. The at least one relationship model indicates a presence of at least one relationship among the plurality of concepts.

In one embodiment of the disclosure, training the on-device AI model comprises determining at least one relationship among the plurality of concepts and training the at least one concept representation generator model and the at least one relationship model using the plurality of concepts and the determined relationship.

In one embodiment of the disclosure, determining the at least one relationship among the plurality of concepts comprises determining at least one of temporal relationships indicating time-based relation among the plurality of concepts, positional relationships indicating position and location based relations among the plurality of concepts, sequential relationships indicating a sequence of relation among the plurality of concepts, and conceptual relationships indicating correlations among plurality of concepts.

In one embodiment of the disclosure, the communicator 230 is configured to transmit the at least one trained on-device AI model to the server 150. In one embodiment of the disclosure, transmitting the at least one trained on-device AI model to the server 150 comprises transmitting weights associated with the at least one trained on-device AI model to generate the global AI model at the server 150 by aggregating the weights received from each candidate edge device 110-NM. According to an embodiment of the disclosure, the communicator 230 is configured to receive the global AI model for deployment from the server 150. In one embodiment of the disclosure, the global AI model is specific to learning of universal vector representation of the concepts available at the candidate edge device and learning of the universal vector representation of concepts available across remaining edge devices of the plurality of edge devices in the distributed environment.

In one embodiment of the disclosure, the AI engine 260 includes the global AI model that is deployed at the edge device 110-NM for universal vector representation of concepts in the candidate edge device. In one embodiment of the disclosure, the global AI model comprises at least one global concept representation generator model for generating the universal vector representation for the plurality of concepts and at least one global relationship model for indicating a presence of at least one relationship among the plurality of concepts.

Although FIG. 2 shows various hardware components of the edge device 110-NM but it is to be understood that embodiments are not limited thereon. According to embodiments of the disclosure, the edge device 110-NM may include less or more number of components. Further, the labels or names of the components are used only for illustrative purpose and does not limit the scope of the disclosure. One or more components can be combined together to perform same or substantially similar function for learning the universal vector representation of concepts in the distributed environment.

Figure 3:
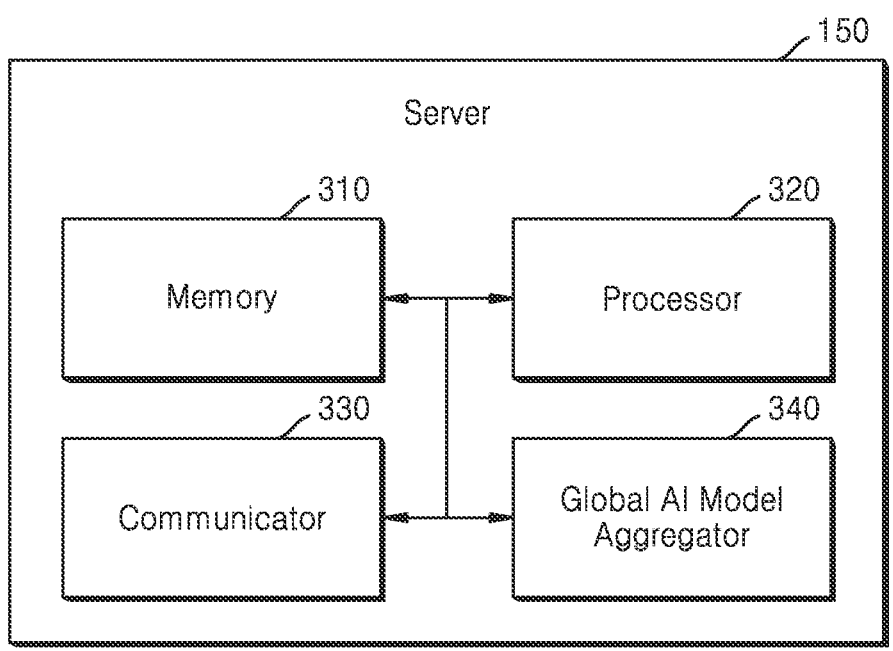
FIG. 3 illustrates a block diagram of a server for learning universal vector representation of concepts in a distributed environment according to an embodiment of the disclosure.

FIG. 3 illustrates a block diagram of a server for learning universal vector representation of concepts in a distributed environment according to an embodiment of the disclosure.

Referring to FIG. 3, in an embodiment of the disclosure, the server 150 includes a memory 310, a processor 320, a communicator 330, and a global AI model aggregator 340.

The memory 310 also stores instructions to be executed by the processor 320. The memory 310 may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory 310 may, in some examples, be considered a non-transitory storage medium. The term "non-transitory" may indicate that the storage medium is not embodied in a carrier wave or a propagated signal. However, the term "non-transitory" should not be interpreted that the memory 310 is non-movable. In some examples, the memory 310 can be configured to store larger amounts of information than the memory 310. In certain examples, a non-transitory storage medium may store data that can, over time, change (e.g., in random access memory (RAM) or cache). In an embodiment of the disclosure, the memory 310 can be an internal storage unit or it can be an external storage unit of the server 150, a cloud storage, or any other type of external storage.

The processor 320 communicates with the memory 310, the communicator 330, and the global AI model aggregator 340. The processor 320 is configured to execute instructions stored in the memory 310 and to perform various processes.

The communicator 330 is configured to receive the at least one trained on-device AI model from the plurality of edge devices. In one embodiment of the disclosure, receiving the at least one trained on-device AI model to the server 150 comprises receiving weights associated with the at least one trained on-device AI model. According to an embodiment of the disclosure, the communicator 330 is configured to transmit the global AI model for deployment from the server 150. In one embodiment of the disclosure, the global AI model is specific to learning of universal vector representation of the concepts available at the candidate edge device and learning of the universal vector representation of concepts available across remaining edge devices of the plurality of edge devices in the distributed environment.

The global AI model aggregator 340 is configured to generate the global AI model at the server 150 by aggregating the weights received from each candidate edge device 110-NM.

Although FIG. 3 shows various hardware components of the server 150 but it is to be understood that embodiments are not limited thereon. According to embodiments of the disclosure, the server 150 may include less or more number of components. Further, the labels or names of the components are used only for illustrative purpose and does not limit the scope of the disclosure. One or more components can be combined together to perform same or substantially similar function for learning the universal vector representation of concepts in the distributed environment.

Figure 4:
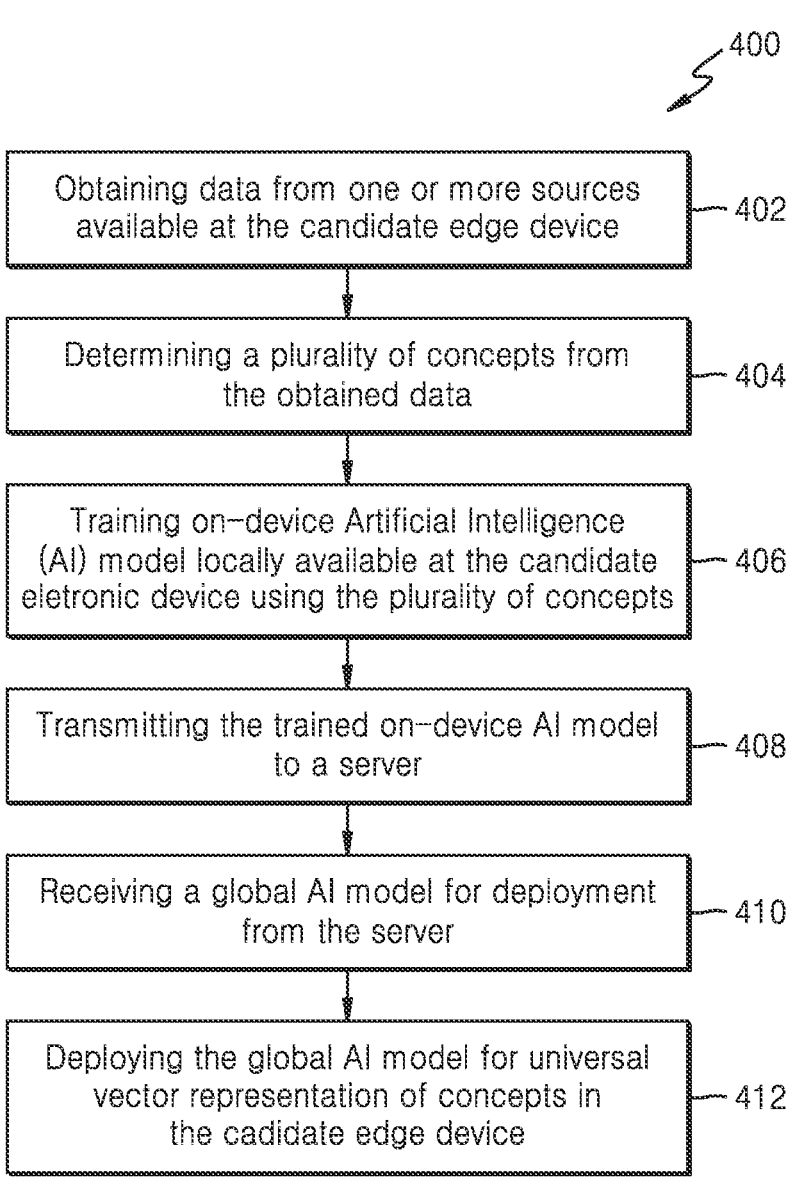
FIG. 4 is a flow diagram illustrating a method implemented by an edge device for learning universal vector representation of concepts in the distributed environment according to an embodiment of the disclosure.

FIG. 4 is a flow diagram 400 illustrating a method implemented by an edge device 110-NM for learning universal vector representation of concepts in a distributed environment according to an embodiment of the disclosure.

Referring to FIG. 4, at operation 402, the method includes obtaining data from the one or more sources available at the edge device 110-NM. In one embodiment of the disclosure, the one or more sources can be sensors located around the edge device 110-NM. According to an embodiment of the disclosure, the one or more sources can be App usage data, and work-out data.

At operation 404, the method includes determining the plurality of concepts from the obtained data. The plurality of concepts can be the plurality of device concepts, the plurality of profile concepts, and the plurality of content concepts. In one embodiment of the disclosure, the concept determiner 250 determines the plurality of device concepts based on sensor information received from the one or more sources available at the edge device 110-NM. The concept determiner 250 determines the plurality of profile concepts based on one or more user behaviour information received from the one or more sources available at the candidate edge device 110-NM. The concept determiner 250 determines the plurality of content concepts determined based on other information received from the one or more sources available at the candidate edge device 110-NM. The other information can be content or media information.

At operation 406, the method includes training the on-device AI model of the AI engine 260 using the plurality of concepts determined. In one embodiment of the disclosure, the trained on-device AI model is specific to learning of universal vector representation of concepts available at that particular edge device 110-NM. In one embodiment of the disclosure, the on-device AI model includes at least one concept representation generator model and at least one relationship model. The at least one concept representation generator model generates at least one concept representation for the plurality of concepts. The at least one relationship model indicates a presence of at least one relationship among the plurality of concepts.

In one embodiment of the disclosure, training the on-device AI model includes determining at least one relationship among the plurality of concepts and training the at least one concept representation generator model and the at least one relationship model using the plurality of concepts and the determined relationship.

In one embodiment of the disclosure, determining the at least one relationship among the plurality of concepts includes determining at least one of temporal relationships indicating time-based relation among the plurality of concepts, positional relationships indicating position and location based relations among the plurality of concepts, sequential relationships indicating a sequence of relation among the plurality of concepts, and conceptual relationships indicating correlations among plurality of concepts.

At operation 408, the method includes transmitting the at least one trained on-device AI model to the server 150. In one embodiment of the disclosure, the communicator 230 is configured to transmit the at least one trained on-device AI model to the server 150. In one embodiment of the disclosure, transmitting the at least one trained on-device AI model to the server 150 includes transmitting weights associated with the at least one trained on-device AI model to generate the global AI model at the server 150 by aggregating the weights received from each candidate edge device 110-NM.

At operation 410, the method includes receiving the global AI model for deployment from the server 150. In one embodiment of the disclosure, the communicator 230 is configured to receive the global AI model for deployment from the server 150. In one embodiment of the disclosure, the global AI model is specific to learning of universal vector representation of the concepts available at the candidate edge device 110-NM and learning of the universal vector representation of concepts available across remaining edge devices of the plurality of edge devices in the distributed environment.

At operation 412, the method includes deploying the global AI model for universal vector representation of concepts in the candidate edge device. In one embodiment of the disclosure, the global AI model is deployed at the edge device for universal vector representation of concepts in the candidate edge device. In one embodiment of the disclosure, the global AI model comprises at least one global concept representation generator model for generating the universal vector representation for the plurality of concepts and at least one global relationship model for indicating a presence of at least one relationship among the plurality of concepts.

Figure 5:
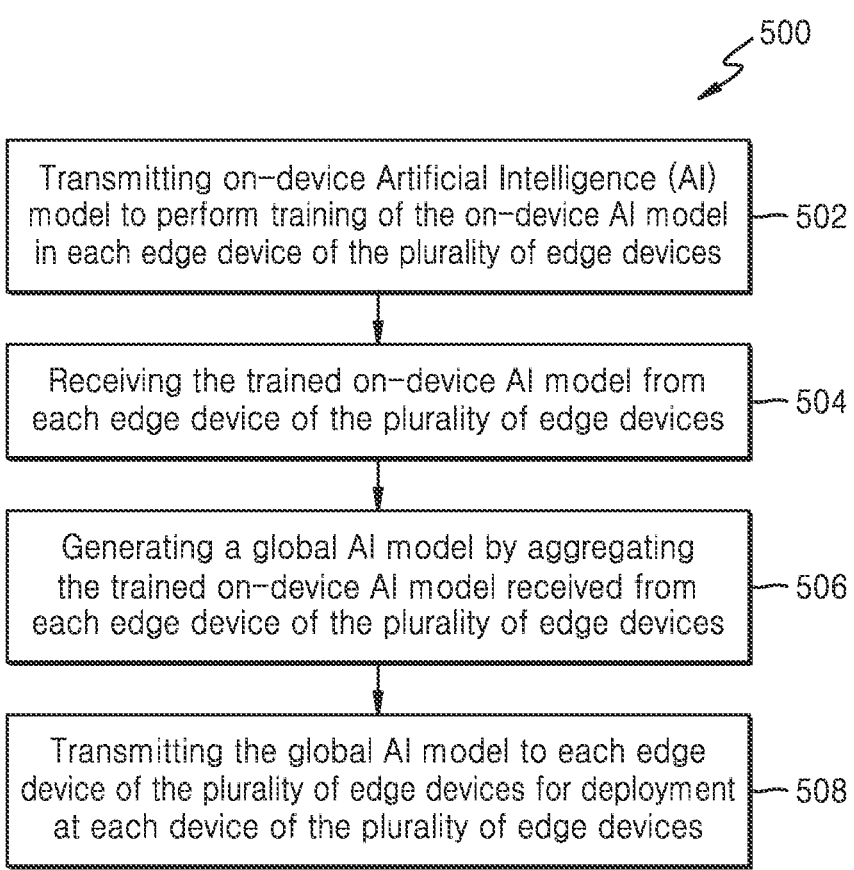
FIG. 5 is a flow diagram illustrating a method implemented by a server for learning universal vector representation of concepts in the distributed environment according to an embodiment of the disclosure.

FIG. 5 is a flow diagram 500 illustrating a method implemented by a server for learning universal vector representation of concepts in a distributed environment according to an embodiment of the disclosure.

Referring to FIG. 5, at operation 502, the method includes transmitting at least one on-device AI model to perform training of the at least one on-device AI model in each edge device 110-NM of the plurality of edge devices.

At operation 504, the method includes receiving at least one trained on-device AI model from each edge device 110-NM of the plurality of edge devices.

At operation 506, the method includes generating the global AI model by aggregating the at least one trained on-device AI model received from each edge device 11-NM of the plurality of edge devices.

At operation 508, the method includes transmitting the global AI model to each edge device 110-NM of the plurality of edge devices for deployment at each edge device of the plurality of edge devices.

Figure 6:
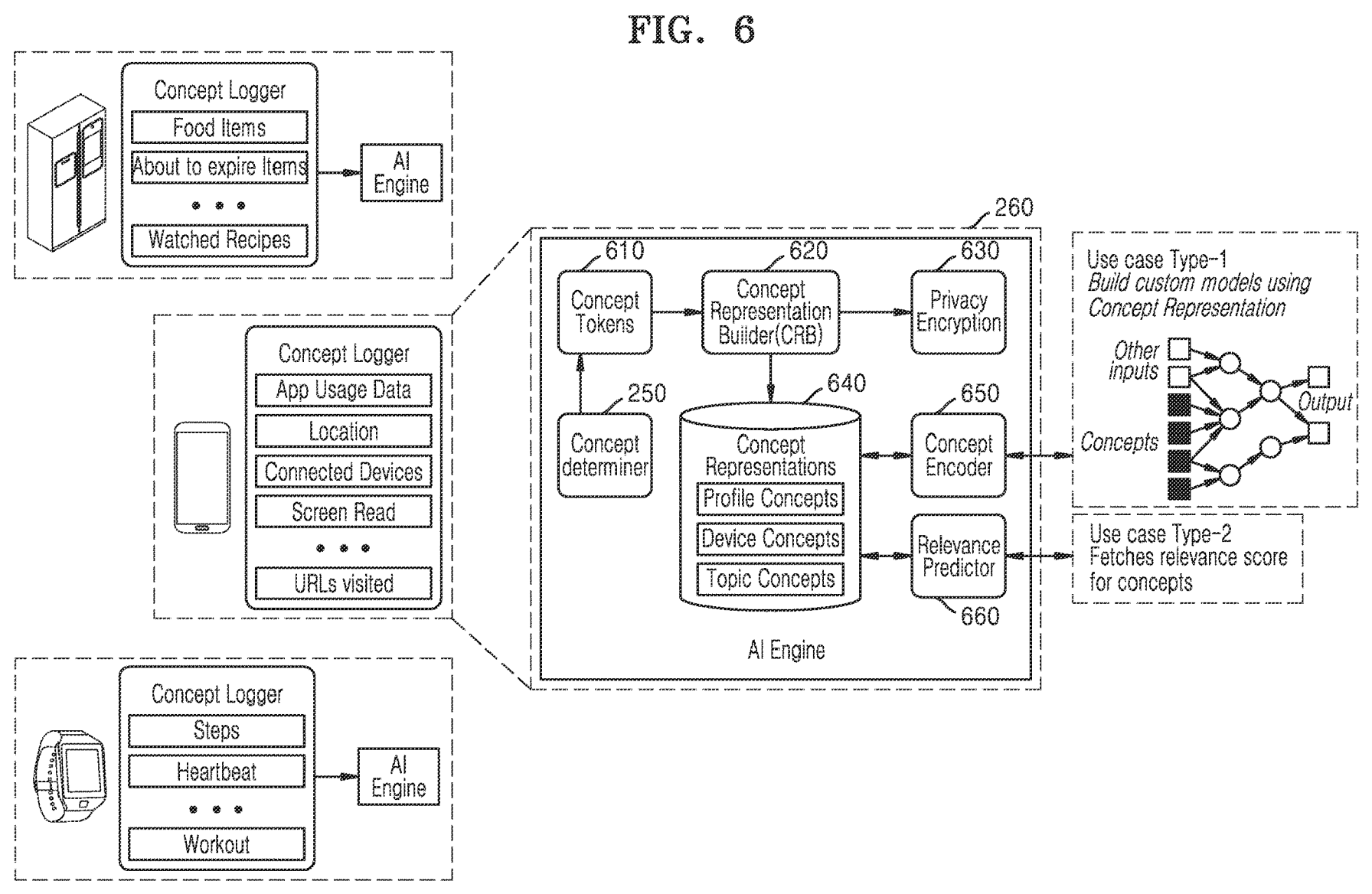

FIG. 6 illustrates an AI engine in an edge device 110-NM for learning universal vector representation of concepts in a distributed environment according to an embodiment of the disclosure.

Referring to FIG. 6, the AI engine 260 collects data from one or more sources available at the edge device (i.e., a smart phone). The AI engine 260 may include a concept determiner 250 that determines a plurality of concepts from the obtained data and store the plurality of concepts in the concepts token database 610. The plurality of concepts from the concept tokens database 610 is passed to a concept representation builder (CRB) 620 for training and to generate the universal vector representation of concepts.

Upon the training is completed/converges, the weights associated with the on-device model in the CRB is encrypted using a privacy Encrypter 630 and shared with the server 150. Upon the training is completed, the local representation of each of the plurality of concepts is stored in concept representations database 640. Further, the AI engine 260 includes a concept encoder 650 that is configured to receive a request to generate vector representation of one or more concepts and transmit the vector representation of the one or more concepts from the concept representation database 640. Further, the AI engine 260 also includes a relevance predictor 660 that is configured to receive a request to generate relevancy between the two or more concepts and transmit the relevancy between the two or more concepts.

Figure 7:
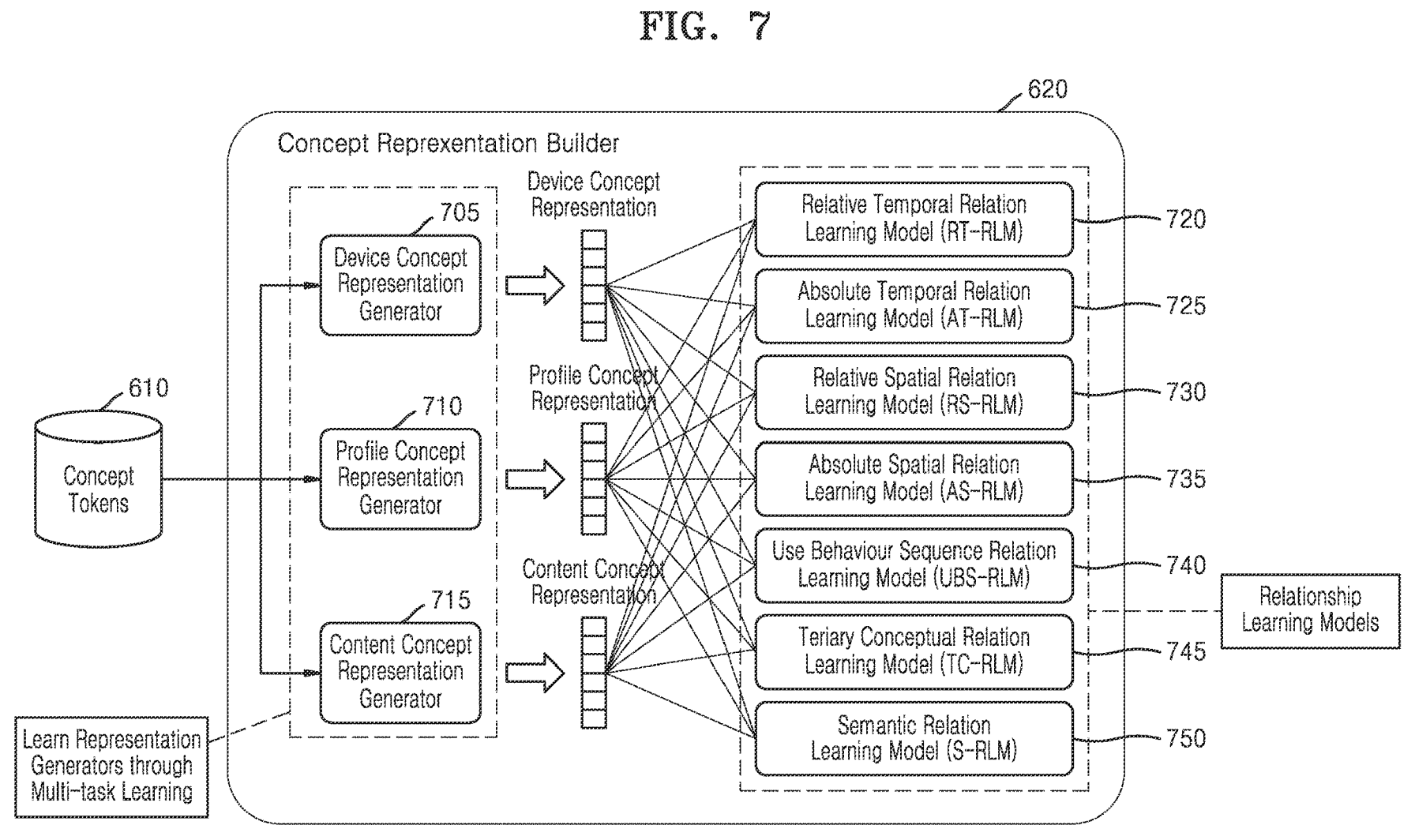

FIG. 7 illustrates a concept representation builder (CRB) in an edge device for learning universal vector representation of concepts in a distributed environment according to an embodiment of the disclosure.

Referring to FIG. 7, the concept representation builder 620 includes a plurality of concept representation generator models for generating concept representation for the plurality of concepts and a plurality of relationship model for indicating a presence of at least one relationship among the plurality of concepts. The process of training the concept representation builder 620 includes fetching concept tokens and relationship data from the concept token database 610 and training concept generator models and relationship models using multi-task learning paradigm until the trained model converges.

The plurality of concept representation generator models comprises a device concept representation generator model 705, a profile concept representation generator model 710, and a content concept representation generator model 715. The plurality of relationship model comprises a relative temporal relation learning model 720, an absolute temporal relation learning model 725, a relative spatial relation learning model 730, an absolute spatial relation learning model 735, a user behaviour sequence relation learning model 740, a tertiary conceptual relation learning model 745, and a semantic relation learning model 750.

Figure 8:
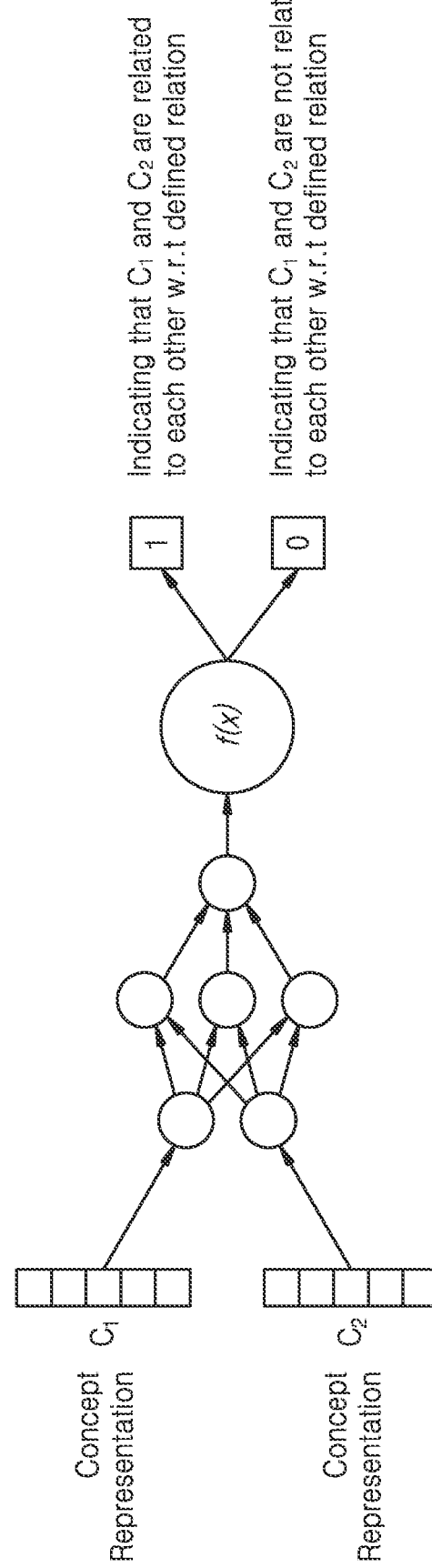
FIG. 8 illustrates a scenario for learning relationship among two concepts according to an embodiment of the disclosure.

FIG. 8 illustrates a scenario for learning relationship among two concepts according to an embodiment of the disclosure.

Referring to FIG. 8, the relation between the concepts C1 and C2 can be generated by inputting the concept representation of C1 and C2 to a relationship learning model. The output of the relationship learning model can be '1' when the concepts C1 and C2 are related to each other w.r.t. defined relation and the output can be '0' when the concepts C1 and C2 are not related to each other w.r.t. defined relation. In one embodiment of the disclosure, the relationship learning model can be the absolute temporal relation learning model 725. According to an embodiment of the disclosure, the relationship learning model can be the semantic relation learning model 750.

Figure 9:
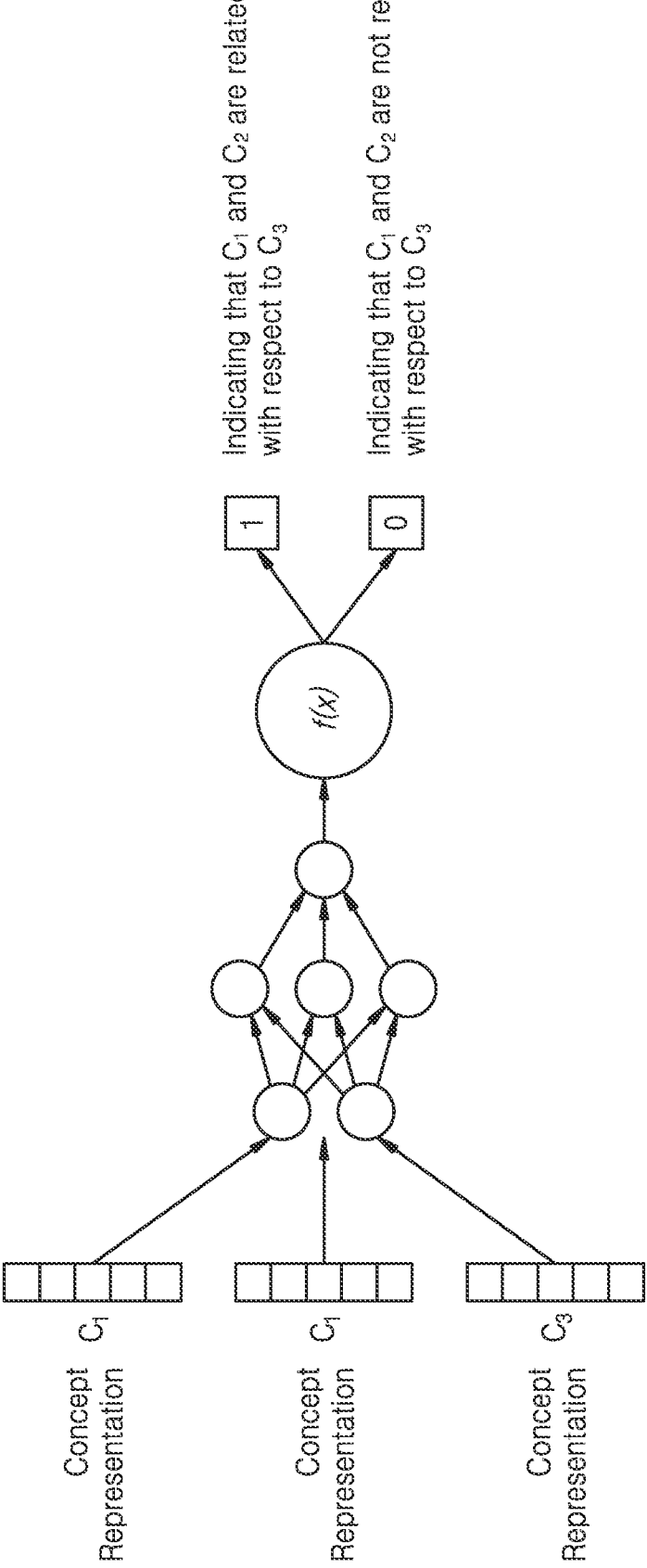
FIG. 9 illustrates a scenario for learning relationship among three concepts according to an embodiment of the disclosure.

FIG. 9 illustrates a scenario for learning relationship among three concepts according to an embodiment of the disclosure.

Referring to FIG. 9, the relation between the concepts C1, C2 and the concept C3 can be generated by inputting the concept representation of C1, C2, and C3 to a relationship learning model. The output of the relationship learning model can be '1' when the concepts C1 and C2 are related with respect to C3 and the output can be '0' when the concepts C1 and C2 are not related with respect to C3. In one embodiment of the disclosure, the relationship learning model can be the absolute temporal relation learning model 725. According to an embodiment of the disclosure, the relationship learning model can be the relative spatial relation learning model 730. According to an embodiment of the disclosure, the relationship learning model can be the tertiary conceptual relation learning model 745.

Figure 10:
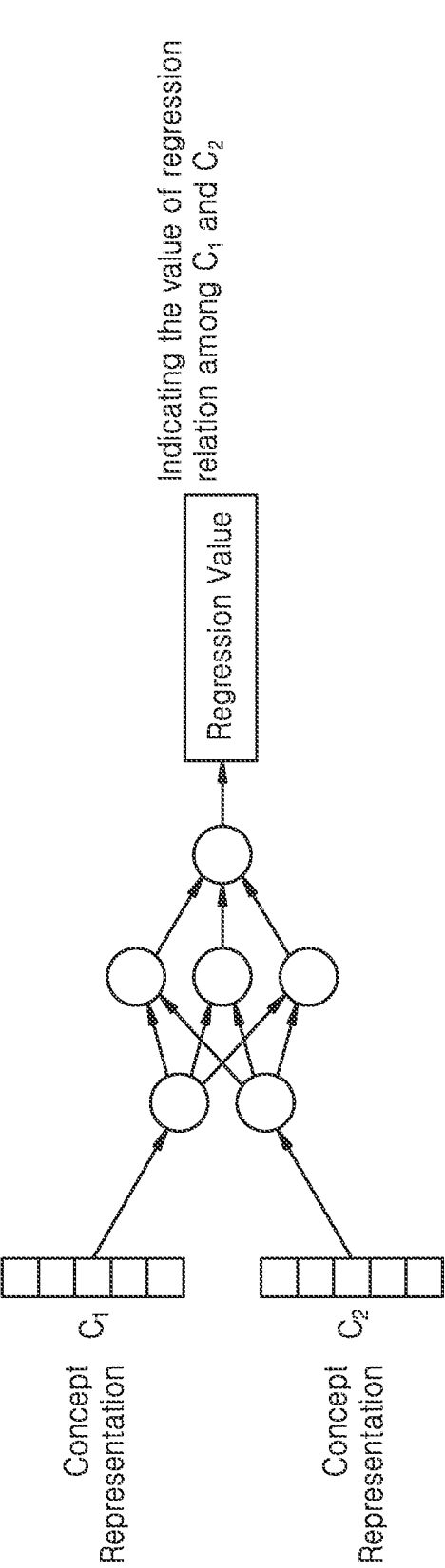
FIG. 10 illustrates a scenario for learning regression relationship among two concepts according to an embodiment of the disclosure.

FIG. 10 illustrates a scenario for learning regression relationship among two concepts according to an embodiment of the disclosure.

Referring to FIG. 10, the regression relation between the concepts C1 and C2 can be generated by inputting the concept representation of C1 and C2 to a relationship learning model. The output of the relationship learning model indicating a value of regression relation among the concepts C1 and C2. In one embodiment of the disclosure, the relationship learning model can be the absolute spatial relation learning model 735.

Figure 11:
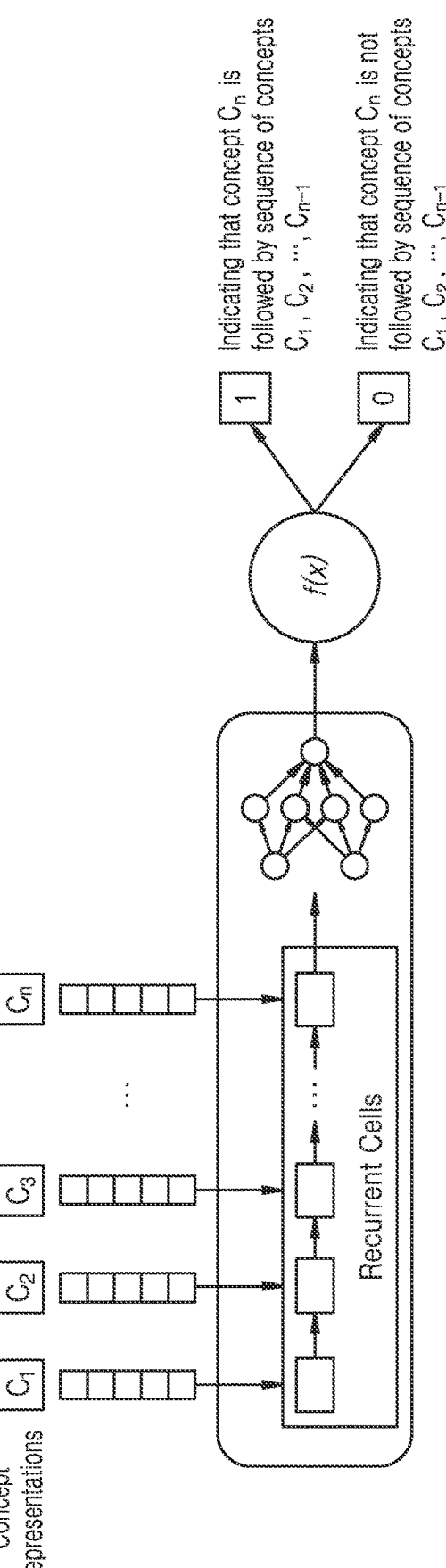
FIG. 11 illustrates a scenario for learning sequential relationship among two or more concepts according to an embodiment of the disclosure.

FIG. 11 illustrates a scenario for learning sequential relationship among two or more concepts according to an embodiment of the disclosure.

Referring to FIG. 11, the sequential relationship between the concepts C1, C2, . . . Cn can be generated by inputting the concept representation of C1, C2, . . . Cn to a relationship learning model. The output of the relationship learning model can be '1' indicating that concept Cn is followed by sequence of concepts C1, C2, . . . Cn−1. The output of the relationship learning model can be '0' indicating that concept Cn is not followed by sequence of concepts C1, C2, . . . Cn−1.

Figure 12:
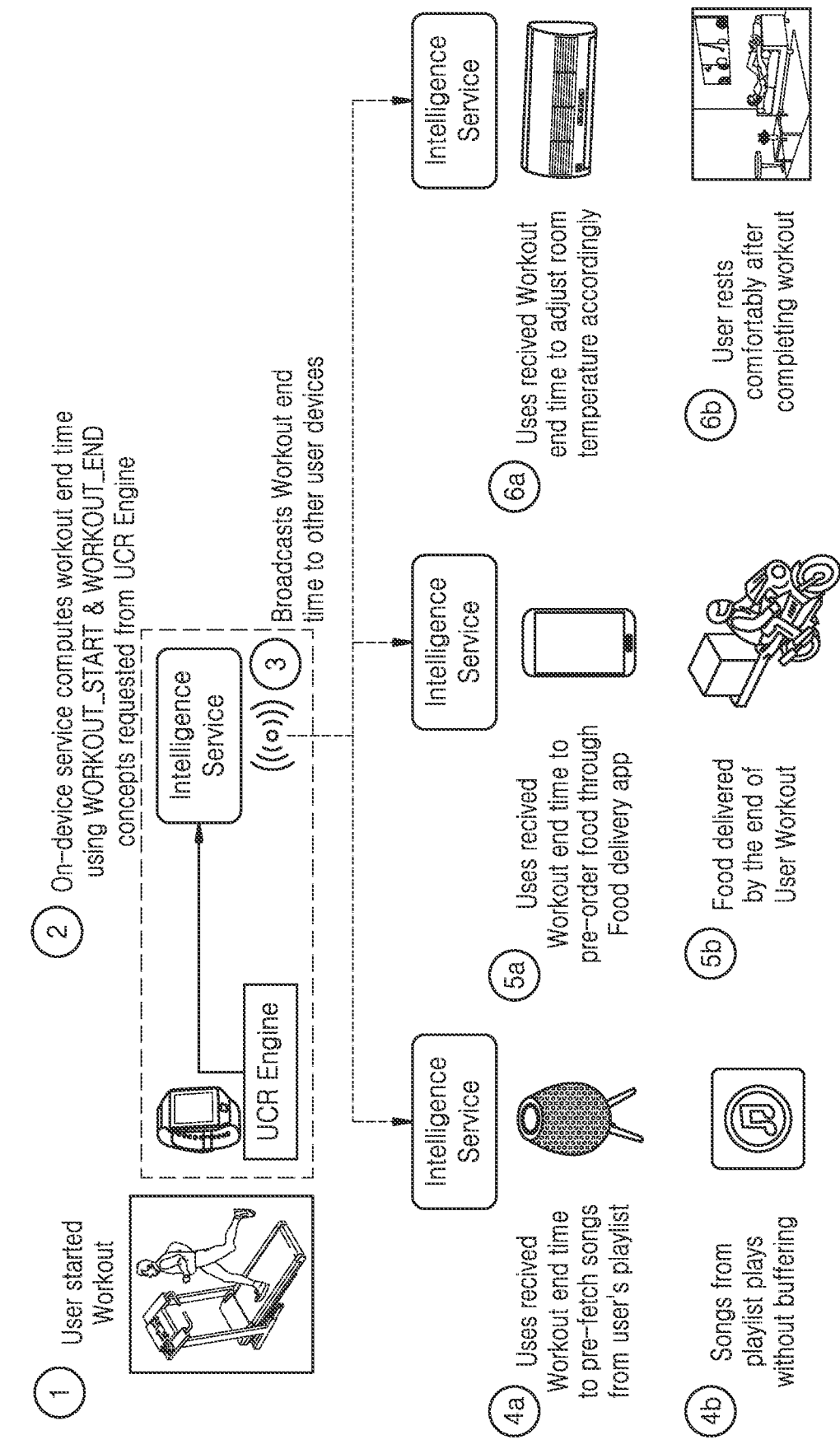
FIG. 12 illustrates a scenario of using universal vector representation according to an embodiment of the disclosure.

FIG. 12 illustrates a scenario of using universal vector representation according to an embodiment of the disclosure.

Referring to FIG. 12, when the user started workout, the AI engine computes workout end time using workout start and workout end concepts. The workout end time is broadcasted to other user devices as shown in step 3, and is used by the plurality of edge devices as shown in steps 4a-4b, 5a-5b, and 6a-6b.

Figure 13:
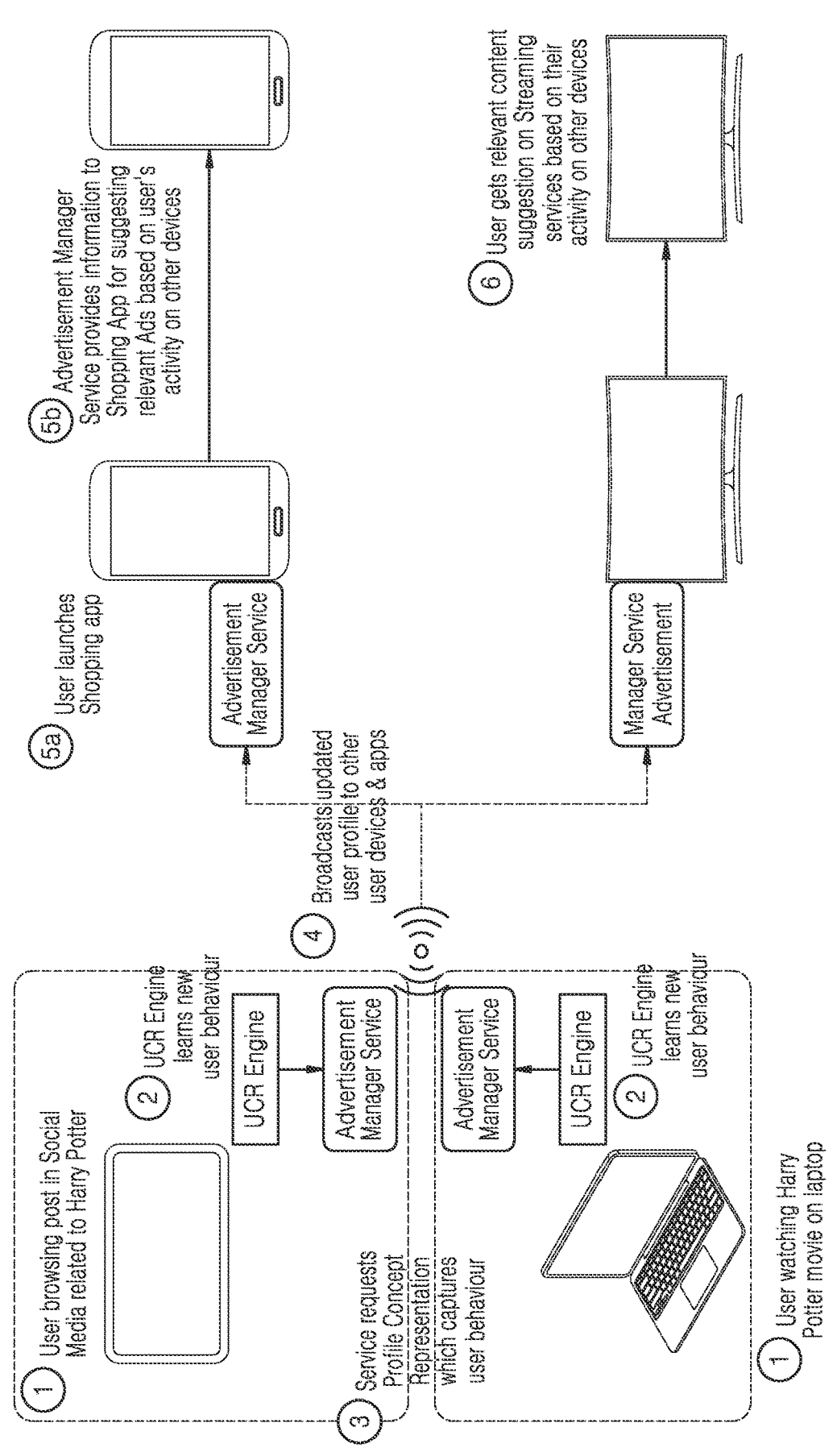
FIG. 13 illustrates a scenario of using universal vector representation according to an embodiment of the disclosure.

FIG. 13 illustrates a scenario of using universal vector representation according to an embodiment of the disclosure.

Referring to FIG. 13, when the user watches harry Potter™ movie or browses posts in social media related to harry potter, the AI engine learns new behaviour of the user and broadcast updated user profile to other user device as shown in step 4, and that is then used by plurality of devices as shown in steps 5a-5b and 6.

Figure 14:
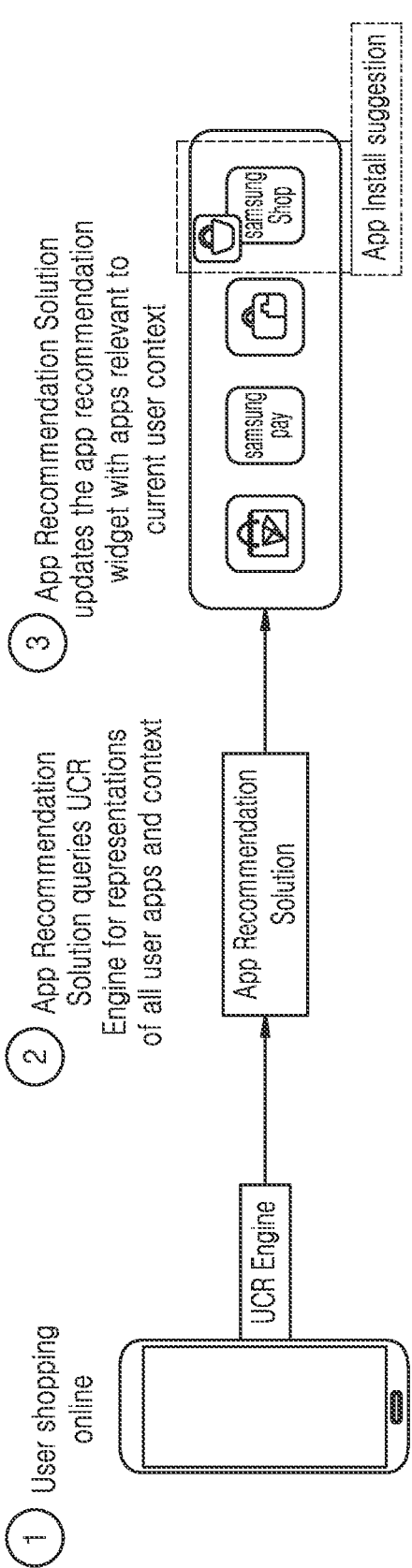
FIG. 14 illustrates a scenario of using universal vector representation according to embodiment of the disclosure.

FIG. 14 illustrates a scenario of using universal vector representation according to an embodiment of the disclosure.

Referring to FIG. 14, when the user is shopping online, the AI engine provide next app recommendations as shown in step 2 and 3.

Figure 15:
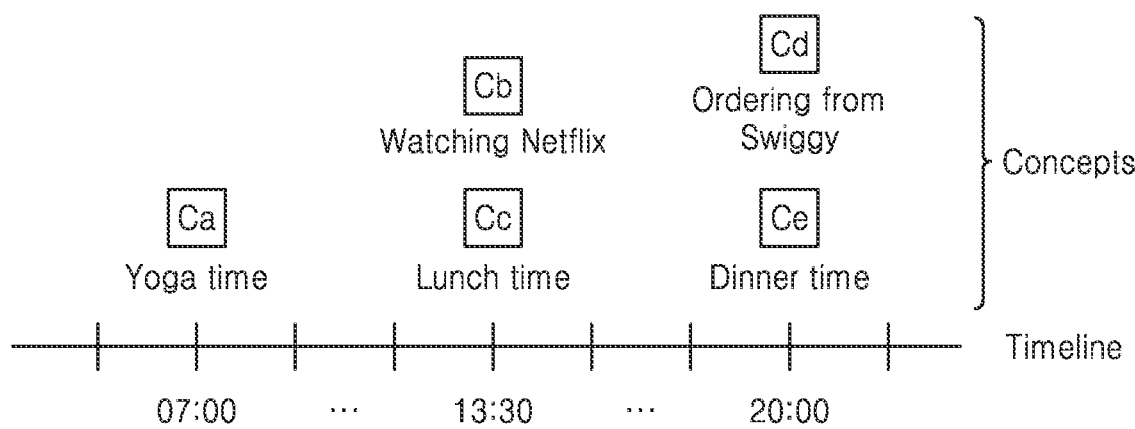
FIG. 15 illustrates a learning relationship between different concepts using an absolute temporal relation learning model according to an embodiment of the disclosure.

FIG. 15 illustrates a scenario of learning relationship between different concepts using an absolute temporal relation learning model according to an embodiment of the disclosure.

Referring to FIG. 15, the relationship between the concepts Yoga time, Watching Netflix, Lunch time, Ordering from Swiggy, and Dinner time is learned by using the absolute temporal relation learning model.

Figure 16:
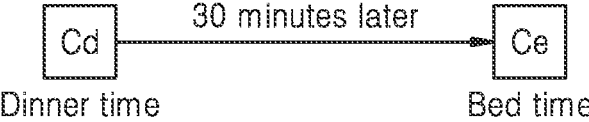
FIG. 16 illustrates a learning relationship between different concepts using a relative temporal relation learning model according to an embodiment of the disclosure.
Figure 16:
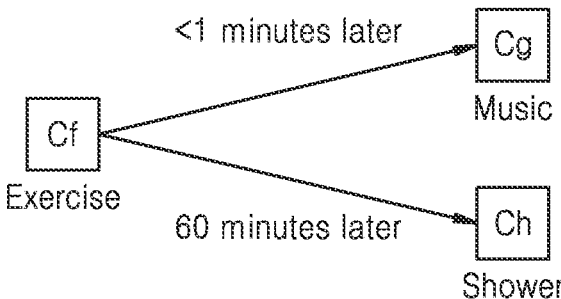

FIG. 16 illustrates a scenario of learning relationship between different concepts using a relative temporal relation learning model according to an embodiment of the disclosure.

Referring to FIG. 16, the relationship between the concepts dinner time, bed time, exercise, music and shower is learned by using the relative temporal relation learning model.

Figure 17:
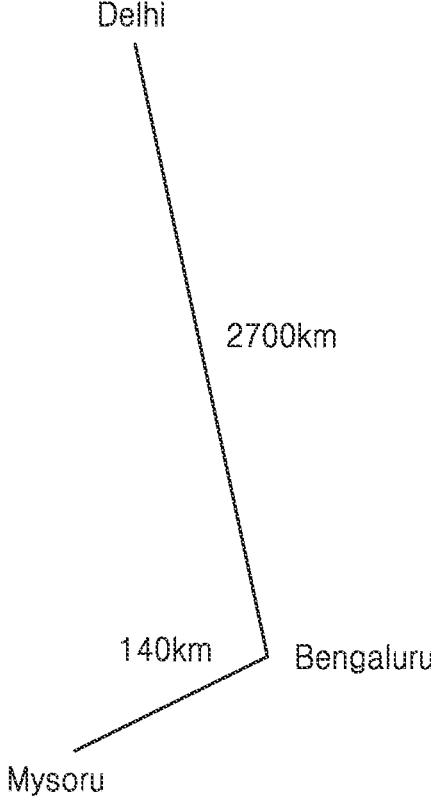
FIG. 17 illustrates a learning relationship between different concepts using an absolute spatial relation learning model according to an embodiment of the disclosure.

FIG. 17 illustrates a scenario of learning relationship between different concepts using an absolute spatial relation learning model according to an embodiment of the disclosure.

Referring to FIG. 17, the relationship between the concepts Mysuru, Bengaluru, and Delhi is learned by using the absolute spatial relation learning model.

Figure 18:
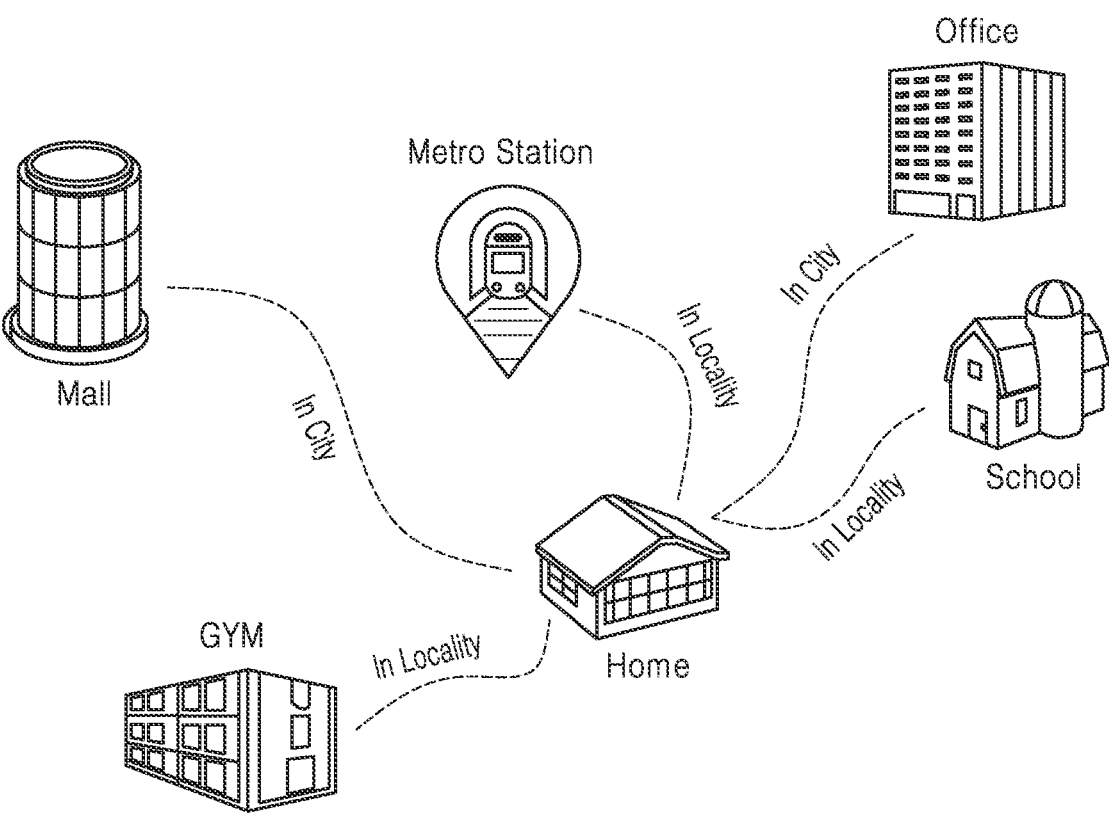
FIG. 18 illustrates a learning relationship between different concepts using a relative spatial relation learning model according to an embodiment of the disclosure.

FIG. 18 illustrates a scenario of learning relationship between different concepts using a relative spatial relation learning model according to an embodiment of the disclosure.

Referring to FIG. 18, the relationship between the concepts home, mall, office, school, and GYM is learned by using the relative spatial relation learning model.

Figure 19:
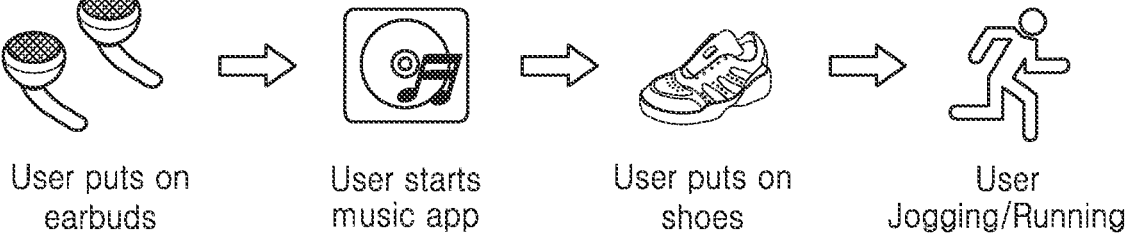
FIG. 19 illustrates a learning relationship between different concepts using a user behaviour sequence relation learning model according to an embodiment of the disclosure.

FIG. 19 illustrates a scenario of learning relationship between different concepts using a user behaviour sequence relation learning model according to an embodiment of the disclosure.

Referring to FIG. 19, the relationship between the concepts user puts on ear buds, user starts music app, user puts on shoes, and user jogging/running is learned by using the user behaviour sequence relation learning model.

Figure 20:
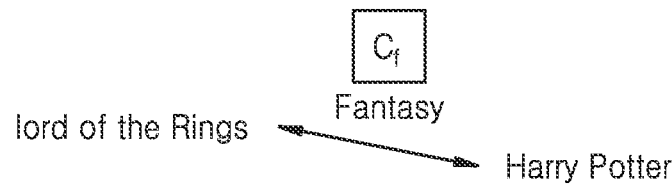
FIG. 20 illustrates a learning relationship between different concepts using a tertiary relation learning model according to an embodiment of the disclosure.
Figure 20:
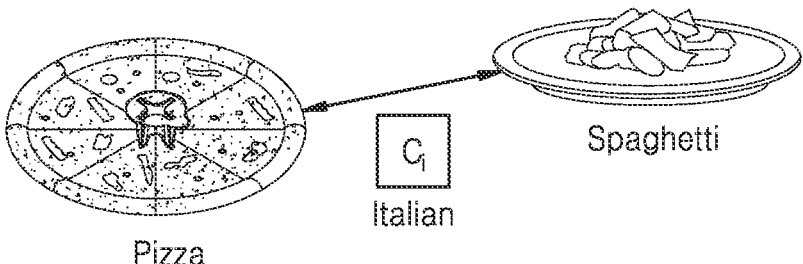

FIG. 20 illustrates a scenario of learning relationship between different concepts using a tertiary relation learning model according to an embodiment of the disclosure.

Referring to FIG. 20, the relationship between the concepts lord of the Rings™ and harry Potter™, pizza and spaghetti is learned by using the tertiary relation learning model.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation.

While the disclosure has been shown and described with reference to various embodiments thereof, it will be understood by those skilled in the art that various changes in form and details may be made therein without departing from the spirit and scope of the disclosure as defined by the appended claims and their equivalents.

According to an embodiment, a method for learning universal vector representation of concepts in a distributed environment comprising a plurality of edge devices is provided. The method may include obtaining, by a candidate edge device from the plurality of edge devices, data from one or more sources available at the candidate edge device. The method may include determining, by the candidate edge device, a plurality of concepts from the obtained data. The method may include training, by the candidate edge device, at least one on-device artificial intelligence (AI) model locally available at the candidate edge device using the plurality of concepts, wherein the at least one trained on-device AI model is specific to learning of universal vector representation of concepts available at the candidate edge device. The method may include transmitting, by the candidate edge device, the at least one trained on-device AI model to a server. The method may include receiving, by the candidate edge device, a global AI model for deployment from the server, wherein the global AI model is specific to learning of universal vector representation of the concepts available at the candidate edge device and learning of the universal vector representation of concepts available across remaining edge devices of the plurality of edge devices in the distributed environment. The method may include deploying, by the candidate edge device, the global AI model for universal vector representation of concepts in the candidate edge device.

According to an embodiment, the method may include determining the plurality of device concepts based on sensor information received from the one or more sources available at the candidate edge device. The method may include determining the plurality of profile concepts based on one or more users behavior information received from the one or more sources available at the candidate edge device. The method may include determining the plurality of content concepts based on other information received from the one or more sources available at the candidate edge device.

According to an embodiment, the method may include the at least one on-device AI model comprises at least one concept representation generator model for generating at least one concept representation for the plurality of concepts and at least one relationship model for indicating a presence of at least one relationship among the plurality of concepts.

According to an embodiment, the method may include determining at least one relationship among the plurality of concepts. The method may include training the at least one concept representation generator model and the at least one relationship model using the plurality of concepts and the determined relationship.

According to an embodiment, the method may include determining at least one of temporal relationships indicating time-based relation among the plurality of concepts, positional relationships indicating position and location based relations among the plurality of concepts, sequential relationships indicating a sequence of relation among the plurality of concepts, or conceptual relationships indicating correlations among plurality of concepts.

According to an embodiment, the method may include transmitting weights associated with the at least one trained on-device AI model to generate the global AI model by aggregating the weights received from each candidate edge device.

According to an embodiment, the method may include at least one global concept representation generator model for generating the universal vector representation for the plurality of concepts and at least one global relationship model for indicating a presence of at least one relationship among the plurality of concepts.

According to an embodiment, the method may include receiving an input comprising one or more concepts, and a request to generate universal vector representation of the one or more concepts. The method may include generating the universal vector representation of the one or more concepts by inputting the one or more concepts to at least one global concept representation generator model of the global AI model.

According to an embodiment, the method may include receiving an input comprising two or more concepts, and a request to generate relevancy between the two or more concepts. The method may include determining universal vector representation of the two or more concepts by inputting the two or more concepts to the at least one global concept representation generator model. The method may include generating the relevancy between the two or more concepts by inputting the determined universal vector representation of the two or more concepts to at least one global relationship model of the global AI model.

According to an embodiment, a method for learning universal vector representation of concepts in a distributed environment comprising a plurality of edge devices is provided. The method may include transmitting, by a server, at least one on-device artificial intelligence (AI) model to perform training of the at least one on-device AI model in each edge device of the plurality of edge devices. The method may include transmitting, by a server, at least one on-device artificial intelligence (AI) model to perform training of the at least one on-device AI model in each edge device of the plurality of edge devices. The method may include receiving, by the server, at least one trained on-device AI model from each edge device of the plurality of edge devices, wherein the at least one trained on-device AI model received from each edge device of the plurality of edge devices is specific to learning of universal representation of concepts available at the edge device of the plurality of edge devices. The method may include generating, by the server, a global AI model by aggregating the at least one trained on-device AI model received from each edge device of the plurality of edge devices. The method may include transmitting, by the server, the global AI model to each edge device of the plurality of edge devices for deployment at each edge device of the plurality of edge devices, wherein the global AI model is specific to learning of the universal vector representation of concepts across the plurality of edge devices in the distributed environment.

According to an embodiment, the method may include receiving, by the server, weights associated with the at least one trained on-device AI model received from each edge device of the plurality of edge devices. The method may include generating, by the server, the global AI model by aggregating the weights received from each edge device.

According to an embodiment, an edge device for learning universal vector representation of concepts in a distributed environment comprising a plurality of edge devices is provided. The edge device may include a memory and at least one processor coupled to the memory. The at least one processor may be configured to obtain data from one or more sources available at the edge device. The at least one processor may be configured to determine a plurality of concepts from the obtained data. The at least one processor may be configured to train on-device artificial intelligence (AI) model locally available at the edge device using the plurality of concepts, wherein the at least one trained on-device AI model is specific to learning of universal vector representation of concepts available at the edge device. The at least one processor is also configured to transmit the trained on-device AI model to a server. The at least one processor may be configured to receive a global AI model for deployment from the server, wherein the global AI model is specific to learning of universal vector representation of the concepts available at the edge device and learning of the universal vector representation of concepts available across remaining edge devices of the plurality of edge devices in the distributed environment. The at least one processor may be configured to deploy the global AI model for universal vector representation of concepts in the edge device.

According to an embodiment, the at least one processor may be configured to determine a plurality of device concepts based on sensor information received from the one or more sources available at the edge device. The at least one processor may be configure to determine a plurality of profile concepts based on one or more users behavior information received from the one or more sources available at the edge device. The at least one processor may be configure to determine a plurality of content concepts based on other information received from the one or more sources available at the edge device.

According to an embodiment, the at least one on-device AI model may comprise at least one concept representation generator model for generating at least one concept representation for the plurality of concepts and at least one relationship model for indicating a presence of at least one relationship among the plurality of concepts.

According to an embodiment, the at least one processor may be configured to determine at least one relationship among the plurality of concepts. The at least one processor may be configure to train the at least one concept representation generator model and the at least one relationship model using the plurality of concepts and the determined relationship.

According to an embodiment, the at least one processor may be configured to determine at least one of temporal relationships indicating time-based relation among the plurality of concepts, positional relationships indicating position and location based relations among the plurality of concepts, sequential relationships indicating a sequence of relation among the plurality of concepts, or conceptual relationships indicating correlations among plurality of concepts.

According to an embodiment, the at least one processor may be configured to transmit weights associated with the at least one trained on-device AI model to generate the global AI model by aggregating the weights received from each edge device.

According to an embodiment, the global AI model may comprise at least one global concept representation generator model for generating the universal vector representation for the plurality of concepts and at least one global relationship model for indicating a presence of at least one relationship among the plurality of concepts.

According to an embodiment, the at least one processor may be configured to receive an input comprising one or more concepts, and a request to generate universal vector representation of the one or more concepts. The at least one processor may be configure to generate the universal vector representation of the one or more concepts by inputting the one or more concepts to at least one global concept representation generator model of the global AI model.

According to an embodiment, the at least one processor may be configured to receive an input comprising two or more concepts, and a request to generate relevancy between the two or more concepts. The at least one processor may be configure to determine universal vector representation of the two or more concepts by inputting the two or more concepts to the at least one global concept representation generator model. The at least one processor may be configure to generate the relevancy between the two or more concepts by inputting the determined universal vector representation of the two or more concepts to at least one global relationship model of the global AI model.

According to an embodiment, a non-transitory computer-readable storage medium, having a computer program for learning universal vector representation of concepts in a distributed environment, which implemented on at least one processor, is provided. The at least one processor may be configured to determine a plurality of concepts from the obtained data. The at least one processor may be configured to train on-device artificial intelligence (AI) model locally available at the edge device using the plurality of concepts, wherein the at least one trained on-device AI model is specific to learning of universal vector representation of concepts available at the edge device. The at least one processor is also configured to transmit the trained on-device AI model to a server. The at least one processor may be configured to receive a global AI model for deployment from the server, wherein the global AI model is specific to learning of universal vector representation of the concepts available at the edge device and learning of the universal vector representation of concepts available across remaining edge devices of the plurality of edge devices in the distributed environment. The at least one processor may be configured to deploy the global AI model for universal vector representation of concepts in the edge device.

According to an embodiment, a server for learning universal vector representation of concepts in a distributed environment comprising a plurality of edge devices is provided. The server may include a memory and at least one processor coupled to the memory. The at least one processor may be configured to send transmit at least one on-device Artificial Intelligence (AI) model to perform training of the at least one on-device AI model in each edge device of the plurality of edge devices. The at least one processor may be configured to receive at least one trained on-device AI model from each edge device of the plurality of edge devices, wherein the at least one trained on-device AI model received from each edge device of the plurality of edge devices is specific to learning of universal representation of concepts available at the edge device of the plurality of edge devices. The at least one processor may be configured to generate a global AI model by aggregating the at least one trained on-device AI model received from each edge device of the plurality of edge devices. The at least one processor may be configured to send transmit the global AI model to each edge device of the plurality of edge devices for deployment at each edge device of the plurality of edge devices, wherein the global AI model is specific to learning of the universal vector representation of concepts across the plurality of edge devices in the distributed environment.

According to an embodiment, the at least one processor may be configured to receive weights associated with the at least one trained on-device AI model received from each edge device of the plurality of edge devices. The at least one processor may be configured to generate the global AI model by aggregating the weights received from each edge device.

What is claimed is:

1. A method for learning universal vector representation of concept tokens in a distributed environment comprising a plurality of edge devices, the method comprising:

obtaining, by a candidate edge device from the plurality of edge devices, data from at least two different domains including sensor information, profile information, content information;

determining, by the candidate edge device, a plurality of concept tokens used to train for at least one on-device artificial intelligence (AI) model from the obtained data;

training, by the candidate edge device, the at least one on-device AI model locally available at the candidate edge device using the plurality of concept tokens, wherein the at least one trained on-device AI model is specific to learning of universal vector representation of concept tokens available at the candidate edge device, wherein the universal vector representation indicates a presence of at least one relationship among a plurality of concept representations corresponding to the plurality of the concept tokens;

transmitting, by the candidate edge device, encrypted weights associated with the at least one trained on-device AI model to generate the global AI model by aggregating the weights received from each candidate edge device to a server;

receiving, by the candidate edge device, a global AI model generated based on the encrypted weights for deployment from the server, wherein the global AI model is specific to learning of universal vector representation of the concept tokens available at the candidate edge device and learning of the universal vector representation of concept tokens available across remaining edge devices of the plurality of edge devices in the distributed environment; and deploying, by the candidate edge device, the global AI model for universal vector representation of concept tokens in the candidate edge device, wherein the at least one relationship comprising at least one of a relative temporal relationship, an absolute temporal relationship, a relative spatial relationship, an absolute spatial relationship, a user behavior sequence relationship, a tertiary conceptual relationship, or a semantic relationship.

2. The method of claim 1, wherein the determining of the plurality of concept tokens comprises at least one of:

determining a plurality of device concept tokens based on sensor information received from the one or more sources available at the candidate edge device;

determining a plurality of profile concept tokens based on one or more users behavior information received from the one or more sources available at the candidate edge device; or determining a plurality of content concept tokens based on other information received from the one or more sources available at the candidate edge device.

3. The method of claim 1, wherein the at least one on-device AI model comprises at least one concept representation generator model for generating at least one concept representation for the plurality of concept tokens and at least one relationship model for indicating the presence of the at least one relationship among the plurality of concept tokens.

4. The method of claim 3, wherein the training, by the candidate edge device, of the at least one on-device AI model locally available at the candidate edge device using the plurality of concept tokens comprises:

determining, by the candidate edge device, at least one relationship among the plurality of concept tokens; and training, by the candidate edge device, the at least one concept representation generator model and the at least one relationship model using the plurality of concept tokens and the determined relationship.

5. The method of claim 4, wherein the determining, by the candidate edge device, of the at least one relationship among the plurality of concept tokens comprises determining at least one of temporal relationships indicating time-based relation among the plurality of concept tokens, positional relationships indicating position and location based relations among the plurality of concept tokens, sequential relationships indicating a sequence of relation among the plurality of concept tokens, or conceptual relationships indicating correlations among plurality of concept tokens.

6. The method of claim 1, wherein the global AI model comprises at least one global concept representation generator model for generating the universal vector representation for the plurality of concept tokens and at least one global relationship model for indicating the presence of the at least one relationship among the plurality of concept tokens.

7. The method of claim 6, further comprising:

receiving, by the candidate edge device, an input comprising one or more concept tokens, and a request to generate universal vector representation of the one or more concept tokens; and generating, by the candidate edge device, the universal vector representation of the one or more concept tokens by inputting the one or more concept tokens to at least one global concept representation generator model of the global AI model.

8. The method of claim 6, further comprising:

receiving, by the candidate edge device, an input comprising two or more concept tokens, and a request to generate relevancy between the two or more concept tokens;

determining, by the candidate edge device, universal vector representation of the two or more concept tokens by inputting the two or more concept tokens to the at least one global concept representation generator model; and generating, by the candidate edge device, the relevancy between the two or more concept tokens by inputting the determined universal vector representation of the two or more concept tokens to at least one global relationship model of the global AI model.

9. An edge device for learning universal vector representation of concept tokens in a distributed environment comprising a plurality of edge devices, the edge device comprising:

a memory; and at least one processor, coupled to the memory, and configured to:

obtain data from at least two different domains including sensor information, profile information, content information, determine a plurality of concept tokens used to train for at least one on-device artificial intelligence (AI) model from the obtained data, train the at least one on-device AI model locally available at the edge device using the plurality of concept tokens, wherein the at least one trained on-device AI model is specific to learning of universal vector representation of concept tokens available at the edge device, wherein the universal vector representation indicates a presence of at least one relationship among a plurality of concept representations corresponding to the plurality of the concept tokens, transmit encrypted weights associated with the at least one trained on-device AI model to generate the global AI model by aggregating the weights received from each candidate edge device to a server, receive a global AI model for deployment from the server, wherein the global AI model generated based on the encrypted weights is specific to learning of universal vector representation of the concept tokens available at the edge device and learning of the universal vector representation of concept tokens available across remaining edge devices of the plurality of edge devices in the distributed environment, and deploy the global AI model for universal vector representation of concept tokens in the edge device, wherein the at least one relationship comprising at least one of a relative temporal relationship, an absolute temporal relationship, a relative spatial relationship, an absolute spatial relationship, a user behavior sequence relationship, a tertiary conceptual relationship, or a semantic relationship.

10. The edge device of claim 9, wherein, to determine the plurality of concept tokens, the at least one processor is further configured to:

determine a plurality of device concept tokens based on sensor information received from the one or more sources available at the edge device, determine a plurality of profile concept tokens based on one or more users behavior information received from the one or more sources available at the edge device, and determine a plurality of content concept tokens based on other information received from the one or more sources available at the edge device.

11. The edge device of claim 9, wherein, the at least one on-device AI model comprises at least one concept representation generator model for generating at least one concept representation for the plurality of concept tokens and at least one relationship model for indicating the presence of the at least one relationship among the plurality of concept tokens.

12. The edge device of claim 11, wherein, to train at least one on-device AI model locally available at the edge device using the plurality of concept tokens, the at least one processor is further configured to:

determine at least one relationship among the plurality of concept tokens, and train the at least one concept representation generator model and the at least one relationship model using the plurality of concept tokens and the determined relationship.

13. The edge device of claim 12, wherein, to determine the at least one relationship among the plurality of concept tokens, the at least one processor is further configured to determine at least one of temporal relationships indicating time-based relation among the plurality of concept tokens, positional relationships indicating position and location based relations among the plurality of concept tokens, sequential relationships indicating a sequence of relation among the plurality of concept tokens, or conceptual relationships indicating correlations among plurality of concept tokens.

14. The edge device of claim 9, wherein the global AI model comprises at least one global concept representation generator model for generating the universal vector representation for the plurality of concept tokens and at least one global relationship model for indicating the presence of the at least one relationship among the plurality of concept tokens.

15. The edge device of claim 14, wherein the at least one processor is further configured to:

receive an input comprising one or more concept tokens, and a request to generate universal vector representation of the one or more concept tokens, and generate the universal vector representation of the one or more concept tokens by inputting the one or more concept tokens to at least one global concept representation generator model of the global AI model.

16. A non-transitory computer-readable storage medium, having a computer program stored thereon that performs, when executed by a processor, the method of claim 1.

* * * * *